US010348506B2

(12) United States Patent
Greiner et al.

(10) Patent No.: US 10,348,506 B2
(45) Date of Patent: Jul. 9, 2019

(54) DETERMINATION OF STATE OF PADDING OPERATION

(71) Applicant: INTERNATIONAL BUSINESS MACHINES CORPORATION, Armonk, NY (US)

(72) Inventors: Dan F. Greiner, San Jose, CA (US); Timothy J. Slegel, Staatsburg, NY (US); Christian Zoellin, Weinstadt (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 299 days.

(21) Appl. No.: 15/281,631

(22) Filed: Sep. 30, 2016

(65) Prior Publication Data

US 2018/0097632 A1 Apr. 5, 2018

(51) Int. Cl.
| H04L 9/32 | (2006.01) |
| G06F 12/14 | (2006.01) |
| H04L 29/06 | (2006.01) |
| G06F 21/60 | (2013.01) |
| H04L 9/06 | (2006.01) |

(52) U.S. Cl.
CPC ........ H04L 9/3242 (2013.01); G06F 12/1408 (2013.01); G06F 21/60 (2013.01); H04L 9/0631 (2013.01); H04L 9/0643 (2013.01); H04L 9/3236 (2013.01); H04L 63/123 (2013.01); G06F 2212/1052 (2013.01); H04L 2209/20 (2013.01); H04L 2209/38 (2013.01)

(58) Field of Classification Search
CPC ... H04L 9/3242; H04L 9/3236; H04L 9/0643; H04L 9/0631; H04L 63/123; H04L 2209/38; H04L 2209/20; G06F 12/1408; G06F 21/60; G06F 2212/1052
See application file for complete search history.

(56) References Cited

U.S. PATENT DOCUMENTS 6,829,355 B2 * 12/2004 Lilly ..................... H04L 9/0643
380/255
6,889,322 B1 * 5/2005 Levy .................... G06Q 20/341
380/28

(Continued)

OTHER PUBLICATIONS

Sobti, R. et al., "Performance Comparison of Keccak, Skein, Grostl, Blake and JH: SHA-3 Final Round Candidate Algorithms on ARM Cortex A8 Processor," International Journal of Security and Its Application, vol. 9, No. 12, 2015 (no further date information available), pp. 367-384.

(Continued)

*Primary Examiner* — Joseph P Hirl
*Assistant Examiner* — J. Brant Murphy
(74) *Attorney, Agent, or Firm* — Steven Chiu, Esq.; Blanche E. Schiller, Esq.; Heslin Rothenberg Farley & Mesiti P.C.

(57) ABSTRACT

An instruction to be used to produce a message digest for a message is executed. In execution, a padding state control of the instruction is checked to determine whether padding has been performed for the message. If the checking indicates padding has been performed, a first action is performed; and if the checking indicates padding has not been performed, a second action, different from the first action, is performed.

20 Claims, 12 Drawing Sheets

(56) References Cited

U.S. PATENT DOCUMENTS

| | | | |
|---|---|---|---|
| 7,151,829 B2 | 12/2006 | Condorelli et al. | |
| 7,159,122 B2* | 1/2007 | Lundvall | G06F 9/3001 380/28 |
| 7,697,682 B2 | 4/2010 | Tsuruga | |
| 8,108,682 B2* | 1/2012 | Watanabe | H04L 9/0643 380/28 |
| 8,275,125 B2 | 9/2012 | Vijayarangan | |
| 9,071,420 B2 | 6/2015 | Yajima et al. | |
| 9,104,400 B2 | 8/2015 | Horsnell et al. | |
| 2002/0191790 A1* | 12/2002 | Anand | G06F 21/72 380/255 |
| 2002/0191791 A1* | 12/2002 | Anand | H04L 9/0643 380/255 |
| 2002/0191792 A1* | 12/2002 | Anand | H04L 9/0643 380/255 |
| 2002/0191793 A1* | 12/2002 | Anand | G06F 21/72 380/255 |
| 2003/0002666 A1 | 1/2003 | Takahashi | |
| 2003/0084309 A1 | 6/2003 | Kohn | |
| 2004/0230814 A1* | 11/2004 | Lundvall | G06F 9/3001 713/189 |
| 2005/0268341 A1* | 12/2005 | Ross | G06F 21/64 726/26 |
| 2006/0253707 A1* | 11/2006 | Lapstun | G06Q 20/401 713/176 |
| 2007/0055886 A1* | 3/2007 | Lundvall | G06F 9/3001 713/176 |
| 2007/0055887 A1 | 3/2007 | Cross et al. | |
| 2007/0168669 A1* | 7/2007 | Jonas | H04L 9/3239 713/176 |
| 2008/0012972 A1* | 1/2008 | Hirai | H04K 1/00 348/294 |
| 2009/0141887 A1* | 6/2009 | Yap | H04L 9/0643 380/28 |
| 2009/0262925 A1* | 10/2009 | Vijayarangan | H04L 9/0637 380/29 |
| 2011/0302418 A1* | 12/2011 | Fujisaki | H04L 9/3242 713/179 |
| 2014/0019771 A1* | 1/2014 | Emmett | H04L 9/002 713/189 |
| 2014/0169555 A1* | 6/2014 | Yajima | H04L 9/0618 380/28 |
| 2015/0382238 A1* | 12/2015 | Davis | H04W 28/06 370/389 |

OTHER PUBLICATIONS

Chen, Z. et al., "A Hardware Interface for Hashing Algorithms", IACR Cryptology ePrint Archive, Dec. 2008, pp. 1-29.

FIPS Pub 202: Federal Information Processing Standards Publication, "SHA-3 Standard: Permutation-Based Hash and Extendable-Output Functions," Aug. 2015, pp. 1-37.

IBM, "z/Architecture—Principles of Operation," IBM Publication No. SA22-7832-10, Eleventh Edition, Mar. 2015, pp. 1-1732.

IBM, "Power ISA—V.207B," Apr. 9, 2016, pp. 1-1527.

* cited by examiner

DETERMINATION OF STATE OF PADDING OPERATION

BACKGROUND

One or more aspects relate, in general, to processing within a computing environment, and in particular, to processing associated with secure message transmission.

Secure message transmission in an electronic information processing context involves encryption and decryption of messages, as well as authentication. A message is encrypted by the sender prior to transmission to ensure that inspection of the encrypted message does not reveal its true content to a third party. On the other hand, a message is decrypted by a recipient to reveal the original content. Additionally, message authentication ensures that the content of the message provided by the sender has not been accidentally or maliciously altered during transmission. Thus, the message received is, in fact, the same as that which was sent.

Authentication is often performed by examining the bits of the message, and using a hashing algorithm to produce a message digest (sometimes referred to as an authentication tag, or simply, a hash) from the examined bits. The security strength of a hashing algorithm (that is, the algorithm's resistance to collision, preimage, and secondary preimage attacks) is indicated by the size of the message digest produced.

The National Institute of Standards and Technology (NIST, in the United States of America) adopted standards for two families of secure hashing algorithms: SHA-1: Digest length of 160 bits, and SHA-2: Digest lengths of 224, 256, 384 and 512 bits (and combinations thereof).

The SHA-1 and SHA-2 algorithms begin with a deterministic nonzero hash tag—called an initial chaining value (ICV)—that is repeatedly permuted by each successive block of the message (the size of a message block is either 64 or 128 bytes). Each permutation produces an output chaining value (OCV) that is used as the ICV for the subsequent permutation. When all full blocks of the message have been processed, the final short block (or null block if no short block remains) is padded up to the full message length, and the last block is used to permute the ICV one final time to produce the resulting message digest (i.e., the tag). Padding is performed once for the message.

Since padding is to be performed once, processing associated with such padding is to be facilitated.

SUMMARY

Shortcomings of the prior art are overcome and additional advantages are provided through the provision of a computer program product for facilitating processing in a computing environment. The computer program product comprises a storage medium readable by a processing circuit and storing instructions for execution by the processing circuit for performing a method. The method includes, for instance, obtaining an instruction to be executed. The instruction is to be used to produce a message digest for a message. The executing includes checking a padding state control of the instruction to determine whether padding has been performed for the message. A first action is performed, based on the checking indicating that padding has been performed. A second action is performed, different from the first action, based on the checking indicating that padding has not been performed.

Processing associated with authentication is facilitated, thereby, improving processing within a computing environment.

In one embodiment, the first action includes performing extended output function processing to perform further processing associated with the message digest. The performing extended output function processing includes, e.g., re-hashing at least a portion of the message digest to produce additional output.

Further, in one embodiment, the second action includes performing padding of at least a portion of the message to form a message block of a select size. The performing padding includes, e.g., adding padding bits to a select location of the at least a portion of the message. The second action further includes, in one embodiment, setting the padding state control to indicate padding has been performed for the message. The padding state control is located, e.g., in a register used by the instruction. In a further example, the padding state control is located in memory accessible to the instruction.

Moreover, in one embodiment, the executing further includes determining, based on the padding state control indicating padding has been performed and based on the instruction beginning execution, whether a length of the message is nonzero, and if so, indicating an exception.

As one example, the instruction is, a Compute Last Message Digest instruction used to process one or more last blocks of the message to produce the message digest to be used in authentication of the message.

The message may be stored in memory, and the instruction provides an address in memory to locate the message.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a capability is provided for determining whether a padding operation has been performed for an instruction, such as an interruptible instruction that produces a message digest, to determine how to proceed with processing. In one example, such a padding operation is performed by a Compute Last Message Digest instruction used to produce a message digest, as described below. Although the examples are described herein with reference to an instruction that produces a message digest, it may be used with other instructions and/or other processing.

One embodiment of a computing environment to incorporate and use one or more aspects of the present invention is described with reference to FIG. 1A. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the INTEL x86 architectures. Other examples also exist.

Figure 1A:
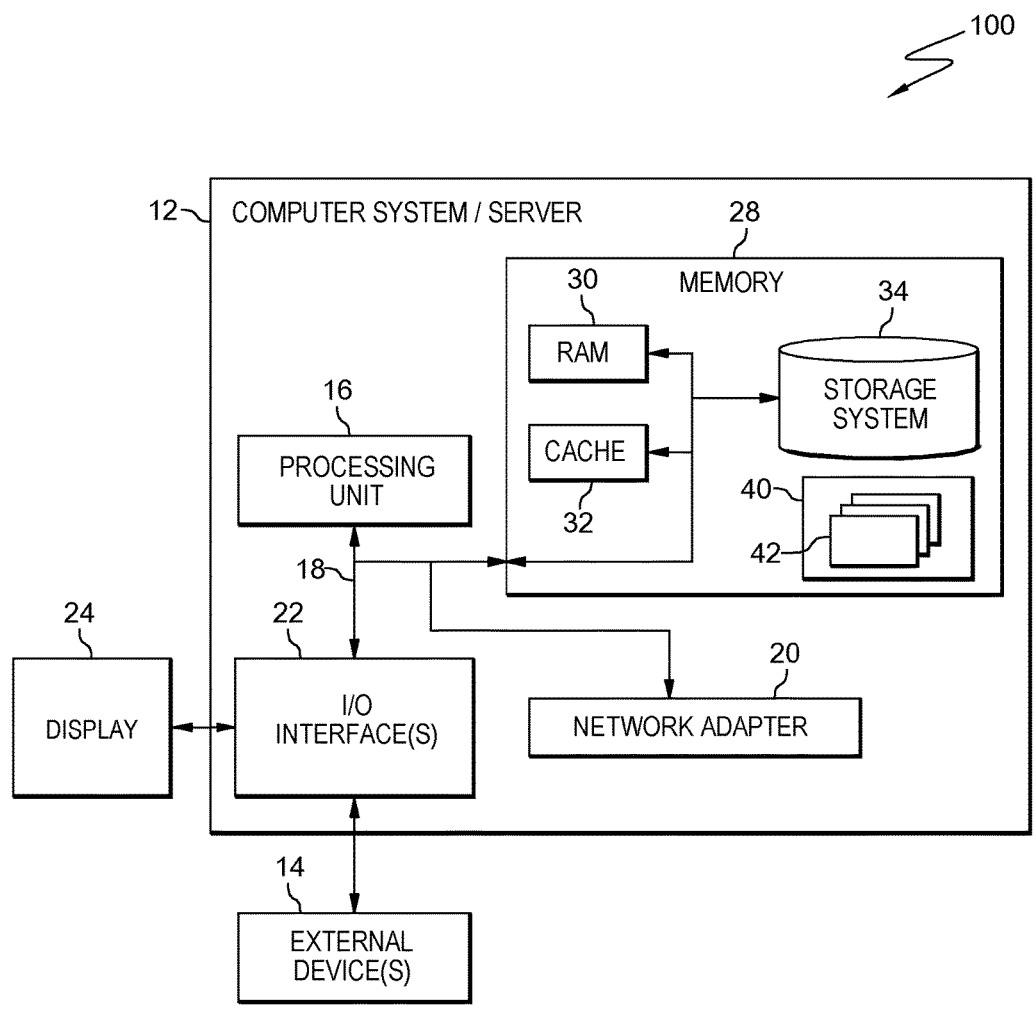
FIG. 1A depicts one example of a computing environment to incorporate and use one or more aspects of the present invention.

As shown in FIG. 1A, a computing environment 100 includes, for instance, a computer system/server 12, which may include, but is not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12;

and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
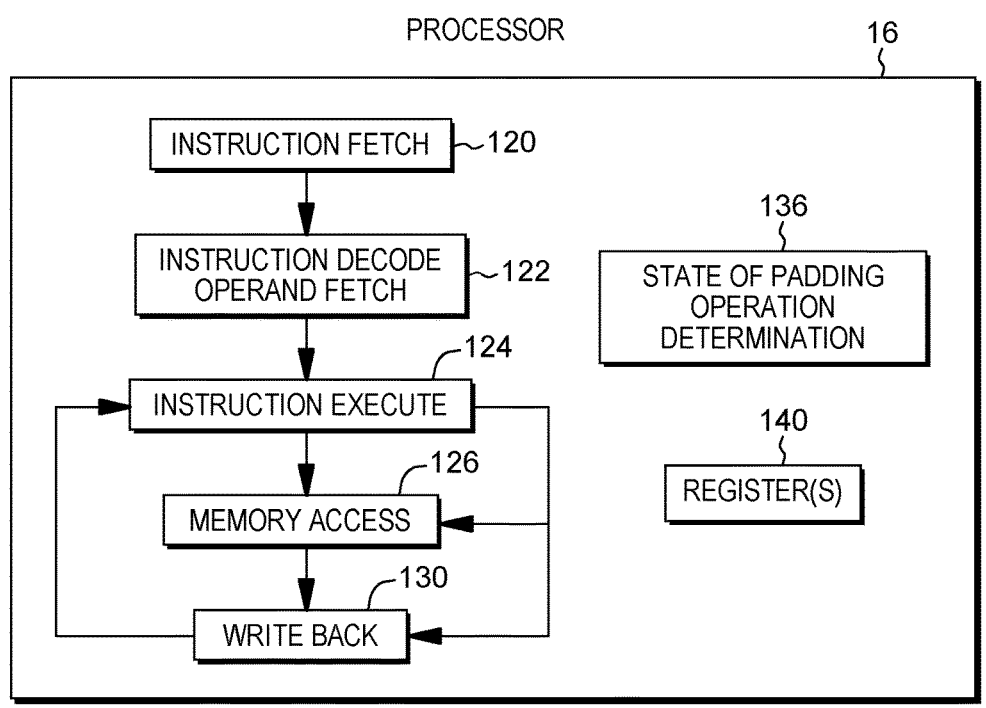
FIG. 1B depicts further details of the processor of FIG. 1A.

In one example, processor 16 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; instruction execute components 124 to execute the decoded instructions; a memory access component 126 to access memory for instruction execution, if necessary; and a write back component 130 to provide the results of the executed instructions. One or more of these components may, in accordance with an aspect of the present invention, be used to determine a state of padding operation 136, as described herein.

Processor 16 also includes, in one embodiment, one or more registers 140 to be used by one or more of the functional components.

Figure 2A:
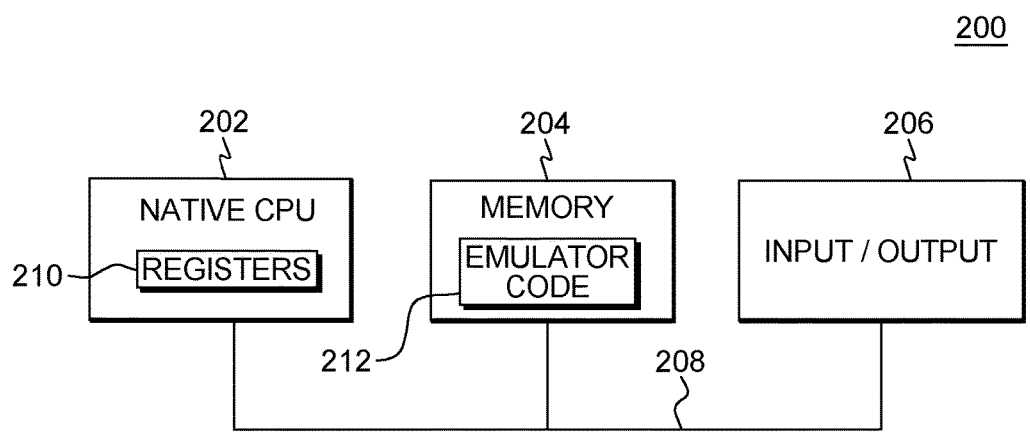
FIG. 2A depicts another example of a computing environment to incorporate and use one or more aspects of the present invention.

Another embodiment of a computing environment to incorporate and use one or more aspects is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a PowerPC processor or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate another architecture. For instance, emulator code 212 allows machines based on architectures other than the z/Architecture, such as PowerPC processors, pSeries servers, HP Superdome servers or others, to emulate the z/Architecture and to execute software and instructions developed based on the z/Architecture.

Figure 2B:
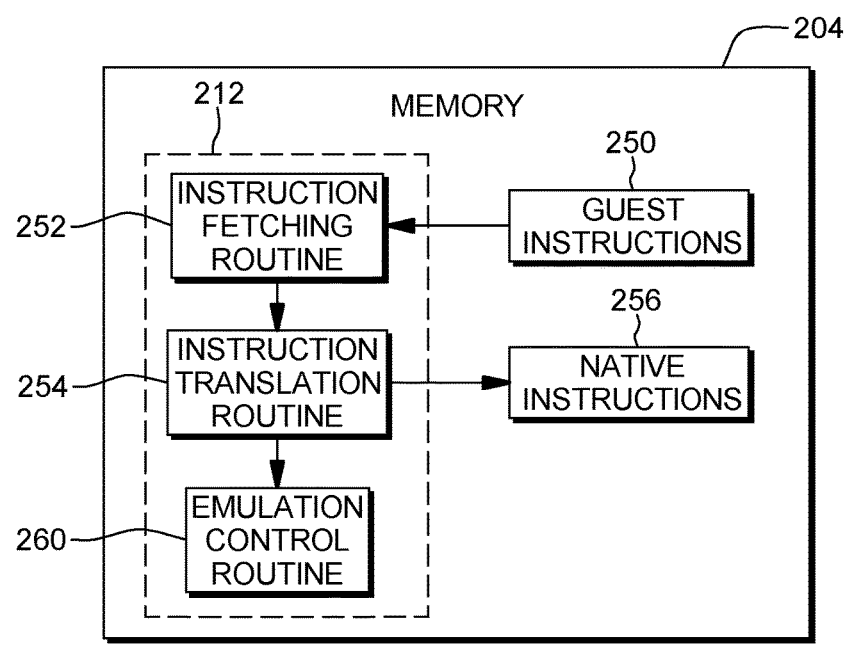
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture processor 16, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 250 that is obtained, translated and executed is the Compute Last Message Digest instruction described herein. The instruction, which is of one architecture (e.g., the z/Architecture), is fetched from memory, translated and represented as a sequence of native instructions 256 of another architecture (e.g., PowerPC, pSeries, Intel, etc.). These native instructions are then executed.

The Compute Last Message Digest (KLMD) instruction is used, in one example, with a Compute Intermediate Message Digest (KIMD) instruction, both of which are defined, e.g., in the z/Architecture, to produce a message digest used for authentication. KIMD is intended to be used when the full length of a message is not available (for example, the message may be arriving in pieces from a network adapter or disk drive); and KLMD is intended to be used for processing the final message block(s), including performing any padding, if necessary.

KIMD and KLMD both operate on a message in memory, which is referred to herein as the second operand of the instruction. The memory address of the leftmost byte of the message is designated by the even-numbered register of an even-odd general register pair, and the length of the message is designated by the odd-numbered register of the pair.

KIMD and KLMD are both defined to set a condition code, if a CPU-determined number of message bytes have been processed, but more message bytes remain; this condition is called partial completion, and results in condition code, e.g., 3 being set. When all of the message bytes have been successfully processed, an alternate condition code is set (this condition is called full completion, and condition code, e.g., 0 is set). For either partial or full completion, the address of the message (in the even-numbered register) is updated by the number of bytes processed, and the remaining length of the message (in the odd-numbered register) is decremented by the same amount. If partial completion occurs, the program can simply branch back to the KIMD or KLMD instruction to continue processing. When full completion occurs, the remaining length in the second operand's odd-numbered register is zero. For any individual message, in this embodiment, the padding is performed once for the message, regardless of whether the processing requires repeated executions of the instruction (i.e., due to partial completion). Therefore, in this embodiment, padding is performed by the KLMD instruction when the final short or null block is processed.

The KIMD and KLMD instructions are configured to support both the SHA-1 and SHA-2 hashing techniques. Further, in accordance with an aspect of the present invention, the KIMD and KLMD instructions are also configured to support another secure hashing technique, referred to as SHA-3. As of Aug. 5, 2015, NIST published the officially-adopted version of the SHA-3 standard. The SHA-3 standard provides digest lengths of 224, 256, 384 and 512 bits (the same as SHA-2), and is designed to provide a security strength that is equal to or exceeds that of SHA-2. SHA-3 uses a permutation algorithm, called Keccak, that differs from the SHA-2 algorithm and may provide superior performance. Keccak is described in FIPS PUB 202: Federal Information Processing Standards Publication, SHA-3 Standard: Permutation-Based Hash and Extendable-Output Functions.

With Keccak, rather than begin with a deterministic nonzero initial chaining value (ICV), Keccak assumes that the ICV for a message is zero. SHA-3 uses a version of Keccak (called Keccak[c]), where the size of each message block is 128 bits (16 bytes). The Keccak functions are called sponge functions, as the permutation of the message is analogous to absorbing it into a sponge, and the product of results is analogous to squeezing a sponge.

The SHA-3 standard also defines two extendable-output functions (XOFs) using digest lengths of, e.g., 128 bits or 256 bits. These XOF functions—also called SHAKE functions (for SHA KEccak)—are similar to the non-SHAKE functions in that they form a hash value from an input message. However, unlike the SHA-3 functions that can only produce a fixed-length message digest, the SHAKE functions can generate an extended output of indefinite length through a feedback mechanism that re-hashes a digest block using Keccak to produce subsequent output block(s). These subsequent output block(s) may be used for additional processing, such as a pseudo-random number generator.

One characteristic of the various algorithms is that a null (i.e., zero-length) message can be processed. Thus, in accordance with an aspect of the present invention, for any individual execution of, e.g., a KLMD SHAKE function, when the length of the message is zero, the instruction is to be able to determine whether padding has been performed. Padding is to occur, e.g., only once for any individual message. The instruction is to distinguish between two otherwise-identical conditions, when the second operand is initially zero: (a) the first execution where padding has not yet been performed, versus (b) a subsequent execution (e.g., after condition code 3), where padding has been performed.

To support the SHA-3 standard, new function codes and new hashing algorithm descriptions are added to the KIMD and KLMD instructions defined, for instance, in the z/Architecture. Further, in one example, for the KLMD SHAKE functions, an additional output operand of the instruction is defined (called the first operand). Similar to the second operand, the first operand specifies a memory location and length of the extended-output function (XOF) data. As with the second operand, the KLMD instruction may generate a CPU-determined number of XOF bytes, update its first operand registers based on the number of XOF bytes generated, and then indicate partial completion by setting a condition code (e.g., CC3). The program can subsequently re-execute the instruction until it indicates successful completion (e.g., CC0).

The initial second operand length for any of the KIMD and KLMD functions may be zero, in which a null message is padded. The padding operation differs based on the function being performed (for SHA-1 and SHA-2, the pad is the message length; for SHA-3 and SHAKE functions, the pad is a predictable sequence of bits). The XOF processing does not begin, in one example, until the entire second operand has been processed—including the padding operation which is to occur once.

Thus, there are two ways that the KLMD instruction can begin execution when the second operand length is zero:
1. A null second operand message is specified, but padding has not yet been performed. This could happen in two ways:
    a. The program issuing the instruction deliberately specified an initial message length of zero.
    b. The program had processed multiple blocks of the message, the last block contained an exact multiple of the block size, and the instruction ended with partial completion before padding was performed.
2. The instruction has already performed padding, and it is continuing with XOF generation following a previous partial completion, e.g., CC3.

Therefore, in accordance with an aspect of the present invention, a capability is provided to distinguish between these two conditions at the beginning of instruction execution. A padding state (PS) control is defined to be an input to, e.g., the KLMD SHAKE processing. In one embodiment, the PS is a bit in, e.g., a general register (in this case, general register 0 which also contains the function codes for the instruction). A value of zero indicates that padding has not been performed, and a value of one indicates that padding has been performed. The program supplies an initial value of zero, and the CPU sets this bit to 1 based on performing padding for the message.

One embodiment of a Compute Last Message Digest (KLMD) instruction, which is configured to use a padding state control, is described with reference to FIGS. 3A-3H. As shown, the instruction has a plurality of fields, and a field may have as subscript number associated therewith. The subscript number associated with a field of the instruction denotes the operand to which the field applies. For instance, the subscript number 1 associated with general register $R_1$ denotes that $R_1$ is associated with the first operand.

Figure 3A:
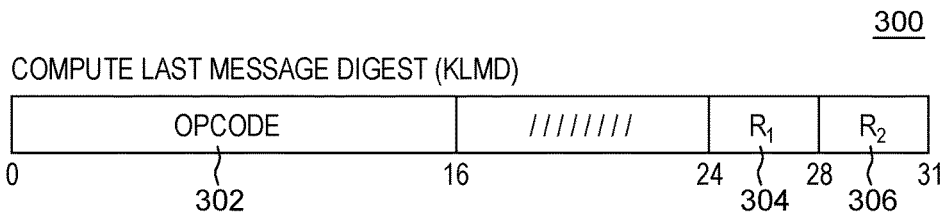
FIG. 3A depicts one embodiment of a format of a Compute Last Message Digest instruction, in accordance with an aspect of the present invention.

In one example, referring to FIG. 3A, a Compute Last Message Digest (KLMD) instruction 300 includes an opcode field 302 (e.g., bits 0-15) having an operation code (opcode) to indicate a compute last message digest operation; a first register field 304 (e.g., bits 24-27) used to designate an even-odd register pair, in which $R_1$ is to designate an even numbered register, except 0; and a second register field 306 (e.g., bits 28-31) used to designate an even-odd register pair, in which $R_2$ is to designate an even-numbered register, except 0. In one example, the contents of the even-odd register pairs designated by the $R_1$ field and the $R_2$ field contain the address and length of the first and second operands, respectively. Each of the fields 304-306, in one example, is separate and independent from the opcode field. Further, in one embodiment, they are separate and independent from one another; however, in other embodiments, more than one field may be combined.

In addition to $R_1$ and $R_2$ encoded in the instruction, one implementation of the instruction uses one or more implied registers including, for instance, general register 0 (GR0) and general register 1 (GR1). Each of the registers is further described below with reference to FIGS. 3B-3G.

Figure 3B:
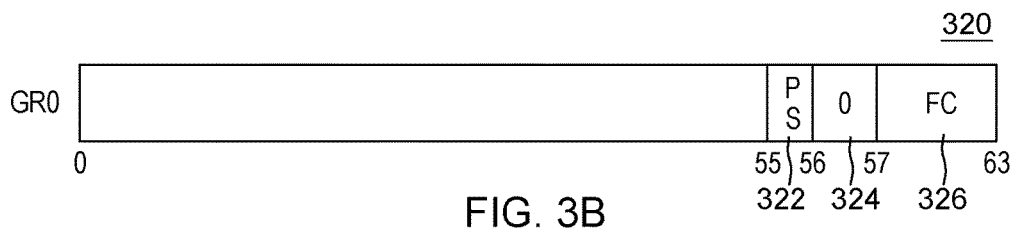
FIG. 3B depicts one example of the contents of a general register, general register 0 (GR0), to be used by one or more aspects of the Compute Last Message Digest instruction of FIG. 3A, in accordance with an aspect of the present invention.

Referring initially to FIG. 3B, one embodiment of a format of general register 0 (320) is described. In one example, general register 0 includes a padding state (PS) control 322 (e.g., bit 55), and a function code (FC) field 326 (e.g., bits 57-63). In one example, bit 56 of general register 0 is to be zero; otherwise a specification exception is recognized, in one example. All other bits of general register 0 are ignored, in this example.

Each of the fields of general register 0 is further described below:

Padding State Control (PS) 322: For the KLMD-SHAKE functions, bit 55 of general register 0 is the padding state; bit 55 of the register is ignored for other functions, in this example.

Function Code (FC) 326: Bit positions 57-63 of general register 0 contain the function code. Examples of assigned function codes for a Compute Last Message Digest operation include:

| Code | Function | Parm. Block Size (bytes) | Data block Size[1] (bytes) |
|---|---|---|---|
| 0 | KLMD-Query | 16 | — |
| 1 | KLMD-SHA-1 | 28 | 64 |
| 2 | KLMD-SHA-256 | 40 | 64 |
| 3 | KLMD-SHA-512 | 80 | 128 |
| 32 | KLMD-SHA3-224 | 200 | 144 |
| 33 | KLMD-SHA3-256 | 200 | 136 |
| 34 | KLMD-SHA3-384 | 200 | 104 |
| 35 | KLMD-SHA3-512 | 200 | 72 |
| 36 | KLMD-SHAKE-128 | 200 | 168 |
| 37 | KLMD-SHAKE-256 | 200 | 136 |

Explanation:
— Non applicable
[1] For all data blocks except the last block. The size of the last data block ranges from 0 to one less than the value shown.

All other function codes are unassigned, in this example.

Figure 3C:
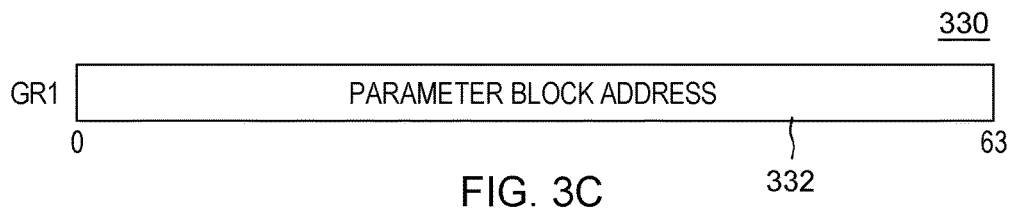
FIG. 3C depicts one example of the contents of another general register, general register 1 (GR1), to be used by the Compute Last Message Digest instruction of FIG. 3A, in accordance with an aspect of the present invention.

As shown in FIG. 3C, general register 1 (330) contains a logical address 332 of the leftmost byte of a parameter block in storage, which is further described below. In the 24-bit addressing mode, the contents of bit positions 40-63 of general register 1 constitute the address, and the contents of bit positions 0-39 are ignored. In the 31-bit addressing mode, the contents of bit positions 33-63 of general register 1 constitute the address, and the contents of bit positions 0-32 are ignored. In the 64-bit addressing mode, the contents of bit positions 0-63 of general register 1 constitute the address.

Figure 3D:
FIG. 3D depicts one example of the contents of a register $R_1$ to be used in one or more aspects by the Compute Last Message Digest instruction of FIG. 3A, in accordance with an aspect of the present invention.
Figure 3E:
FIG. 3E depicts one example of the contents of a register $R_1+1$ to be used in one or more aspects by the Compute Last Message Digest instruction of FIG. 3A, in accordance with an aspect of the present invention.

Referring to FIG. 3D, a location 342 of the leftmost byte of the first operand is specified by the contents of the $R_1$ general register 304. Further, referring to FIG. 3E, the number of bytes (i.e., length) 352 in the first operand location is specified in general register $R_1+1$ (350). The first operand is only applicable, in this embodiment, to the KLMD-SHAKE functions and is ignored for the other functions.

Figure 3F:
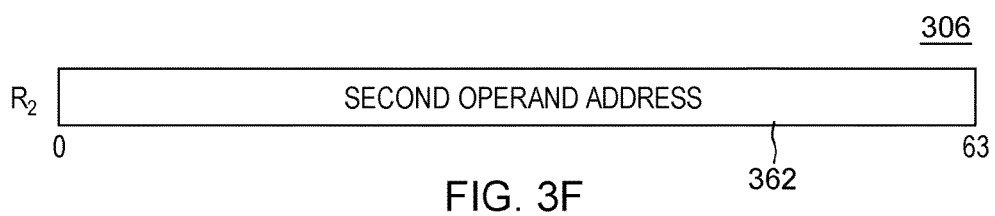
FIG. 3F depicts one example of the contents of a register $R_2$ to be used in one or more aspects by the Compute Last Message Digest instruction of FIG. 3A, in accordance with an aspect of the present invention.
Figure 3G:
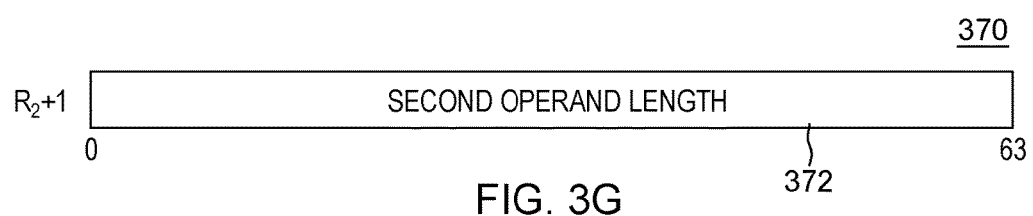
FIG. 3G depicts one example of the contents of a register $R_2+1$ to be used in one or more aspects by the Compute Last Message Digest instruction of FIG. 3A, in accordance with an aspect of the present invention.

Referring to FIG. 3F, a location 362 of the leftmost byte of the second operand is specified by the contents of the $R_2$ general register 306. Further, referring to FIG. 3G, the number of bytes (i.e., length) 372 in the second operand location is specified in general register $R_2+1$ (370).

In operation of one embodiment of the KLMD instruction, the query function provides the means of indicating the availability of the other functions. The contents of general registers $R_1$, $R_1+1$, $R_2$ and $R_2+1$ are ignored for the query function.

For the other functions, the second operand (e.g., the value at the location specified using the address specified in $R_2$) is processed as specified by the function code using an initial chaining value in a parameter block, described below, and the result replaces the chaining value. For the SHA-1, SHA-256, and SHA-512 functions, the operation also uses a message bit length in the parameter block. The operation proceeds until the end of the second operand location is reached or a CPU-determined number of bytes have been processed, whichever occurs first.

For the KLMD-SHAKE functions, when the end of the second operand is reached, an extended-output function (XOF) digest is stored at the first operand location (e.g., specified in $R_1$). The operation then proceeds until either the end of the first operand location is reached or a CPU-determined number of bytes have been stored, whichever occurs first.

The result is indicated in the condition code.

As part of the operation, the address in general register $R_2$ is incremented by the number of bytes processed from the second operand, and the length in general register $R_2+1$ is decremented by the same number. The formation and updating of the address and length is dependent on the addressing mode.

For instance, in the 24-bit addressing mode, the contents of bit positions 40-63 of general register $R_2$ constitute the address of the second operand, and the contents of bit positions 0-39 are ignored; bits 40-63 of the updated address replace the corresponding bits in general register $R_2$, carries out of bit position 40 of the updated address are ignored, and the contents of bit positions 32-39 of general register $R_2$ are set to zeros. In the 31-bit addressing mode, the contents of bit positions 33-63 of general register $R_2$ constitute the address of the second operand, and the contents of bit positions 0-32 are ignored; bits 33-63 of the updated address replace the corresponding bits in general register $R_2$, carries out of bit position 33 of the updated address are ignored, and the content of bit position 32 of general register $R_2$ is set to zero. In the 64-bit addressing mode, the contents of bit positions 0-63 of general register $R_2$ constitute the address of the second operand; bits 0-63 of the updated address replace the contents of general register $R_2$ and carries out of bit position 0 are ignored.

In both the 24-bit and the 31-bit addressing modes, the contents of bit positions 32-63 of general register $R_2+1$ form a 32-bit unsigned binary integer which specifies the number of bytes in the second operand; and the updated value replaces the contents of bit positions 32-63 of general register $R_2+1$. In the 64-bit addressing mode, the contents of bit positions 0-63 of general register $R_2+1$ form a 64-bit unsigned binary integer which specifies the number of bytes in the second operand; and the updated value replaces the contents of general register $R_2+1$.

In the 24-bit or 31-bit addressing mode, the contents of bit positions 0-31 of general registers $R_2$ and $R_2+1$, remain unchanged.

For the two KLMD-SHAKE functions (e.g., Function Codes 36, 37), the following applies:

Bit 55 of general register 0 is the padding state (PS) control. A value of, e.g., zero indicates that padding of the second operand has not yet been performed. A value of, e.g., one indicates that padding of the second operand has been performed.

A specification exception is recognized, and the operation is suppressed when the padding state is one and the second operand length in general register $R_2+1$ is nonzero at the beginning of the instruction.

When the remaining second operand length is zero, the CPU inspects the padding state to determine whether padding of the second operand is to be performed. The padding state is set to one by the CPU when padding of the second operand has been performed.

The $R_1$ field designates an even-odd pair of general registers and is to designate an even-numbered register other than general register 0 and other than register $R_2$; otherwise a specification exception is recognized, in one example.

The location of the leftmost byte of the first operand is specified by the contents of general register $R_1$. The number of bytes in the first operand location is specified in general register $R_1+1$.

As a part of the operation, the address in general register $R_1$ is incremented by the number of bytes stored into the first operand, and the length in general register $R_1+1$ is decremented by the same number. The formation and updating of the address and length is dependent on the addressing mode.

The addressing mode characteristics for general register $R_1$ and the length characteristics for general register $R_1+1$ are the same as those for general registers $R_2$ and $R_2+1$, respectively, as described above.

For functions other than the two KLMD-SHAKE functions, bit 55 of general register 0 and the $R_1$ field of the instruction are ignored, in this embodiment. In this case, a first operand is not present, and general registers $R_1$ and $R_1+1$ are not modified.

In the access-register mode, access registers 1 and $R_2$ specify the address spaces containing the parameter block and second operand, respectively. For the KLMD-SHAKE functions, access register $R_1$ specifies the address space containing the first operand.

The result is obtained as if processing starts at the left end of the second operand and proceeds to the right, block by block. For all functions except the KLMD-SHAKE functions, the operation is ended when all source bytes in the second operand have been processed (called normal completion), or when a CPU-determined number of blocks that is less than the length of the second operand have been processed (called partial completion). The CPU-determined number of blocks depends on the model, and may be a different number each time the instruction is executed. The CPU-determined number of blocks is usually nonzero. In certain unusual situations, this number may be zero, and condition code, e.g., 3 may be set with no progress. However, the CPU protects against endless reoccurrence of this no-progress case.

When a chaining value field (e.g., in the parameter block) overlaps any portion of the first or second operand, the result in the chaining value field is unpredictable.

For the KLMD-SHA-1, KLMD-SHA-256, and KLMD-SHA-512 functions, after all bytes in the second operand as specified in general register $R_2+1$ have been processed, a padding operation is performed, a final hashing operation is performed on the padded block, and then normal completion occurs. For the KLMD-SHA3 and KLMD-SHAKE functions, after all full blocks of the second operand have been processed, the padding operation is performed on either the remaining partial block or on a null block, and a final hashing operation is performed on the padded block. Normal completion then occurs for the KLMD-SHA3 functions.

For the KLMD-SHAKE functions, in accordance with an aspect of the present invention, when padding has been performed, the padding state is set to one in general register 0, and an extended-output function (XOF) message digest is stored into the first operand location. XOF message-digest generation is ended when all of the first operand has been stored (called normal completion) or when a CPU-determined number of blocks that is less than the length of the first operand have been stored (called partial completion). The CPU-determined number of blocks depends on the model, and may be a different number each time the instruction is executed. The CPU determined number of blocks is usually nonzero. In certain unusual situations, this number may be zero, and condition code, e.g., 3 may be set with no progress. However, the CPU protects against endless reoccurrence of this no-progress case.

When the operation ends due to normal completion, condition code, e.g., 0 is set, the second operand address in general register $R_2$ is updated, and the second operand length in general register $R_2+1$ is zero; for the KLMD-SHAKE functions, the first-operand address in general register $R_1$ is updated, and the first operand length in general register $R_1+1$ is zero.

When the operation ends due to partial completion, condition code, e.g., 3 is set. For functions except the KLMD-SHAKE functions, the resulting value in general register $R_2+1$ is nonzero. For the KLMD-SHAKE functions, if the second operand has not been completely processed, the resulting value in general register $R_2+1$ is nonzero, and if the first operand has not been completely processed, the resulting value in general register $R_1$ is nonzero.

When the second operand length is initially zero, the second operand is not accessed, the second operand address and second operand length in general registers $R_2$ and $R_2+1$, respectively, are not changed, and condition code, e.g., 0 is set. However, the empty block (L=0) case padding operation is performed and the result is stored into the parameter block.

For the KLMD-SHAKE functions, when the first operand length is initially zero, the first operand is not accessed, and the first operand address and first operand length in general registers $R_1$ and $R_1+1$, respectively, are not changed. However, even when the first operand length is initially zero, the parameter block is updated.

A PER storage-alteration event may be recognized for the portion of the parameter block and first operand location (when applicable) that is stored. A PER zero-address-detection event may be recognized for the first operand location (when applicable), for the second operand location and for the parameter block. When PER events are detected for more than one location, it is unpredictable which location is identified in the PER access identification (PAID) and PER ASCE ID (AI).

As observed by this CPU, other CPUs, and channel programs, references to the parameter block and storage operands may be multiple-access references, accesses to these storage locations are not necessarily block-concurrent, and the sequence of these accesses or references is undefined.

Access exceptions may be reported for a larger portion of the first operand (when applicable) and second operand than is processed in a single execution of the instruction; however, access exceptions are not recognized for locations beyond the length of the first or second operand nor for locations more than 4K bytes beyond the current location being processed.

As indicated above, the Compute Last Message Digest instruction is configured to perform a plurality of functions. Two of these functions, the KLMD-SHAKE-128 and KLMD-SHAKE-256 functions, are described below. In describing these functions, the symbol xp<n> refers to n padding bytes used by SHAKE functions. Bit positions 3 through 7 of the leftmost byte of the pad contain binary ones, and bit position 0 of the rightmost pad byte contains a binary one. (This is for a big endian format, and can be different for other formats, like little endian, as an example.) All other bits are zeros, in one example. Padding for SHAKE functions is performed, for instance, when the padding state (PS, bit 55 of general register 0) is zero, and the remaining second operand length is less than the data-block size.

KLMD-SHAKE-128 (KLMD Function Code 36)

Figure 3H:
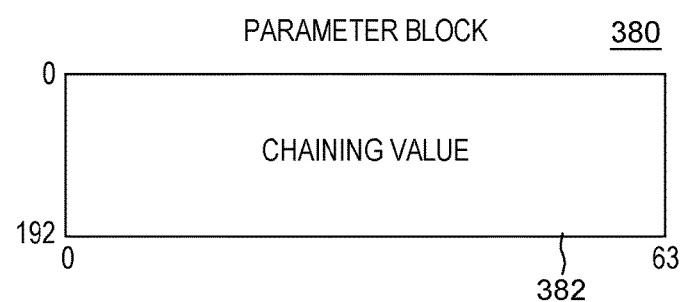
FIG. 3H depicts one example of a parameter block to be used in one or more aspects by the Compute Last Message Digest instruction of FIG. 3A, in accordance with an aspect of the present invention.

With this function, in one example, referring to FIG. 3H, a parameter block 380 is used that includes a chaining value 382. Initially, chaining value 382 includes an initial chaining value (ICV). The initial chaining value represents, e.g., a 1600-bit state array used by the Keccak[c] functions which implement the SHA-3 and SHAKE algorithms.

In operation of this function, when the length of the second operand in general register $R_2+1$ is greater than or equal to 168 bytes, a 200-byte intermediate message digest is generated for the 168-byte message blocks in operand 2 using the Keccak[c] algorithm with the 200-byte initial chaining value in parameter block 380. The generated intermediate message digest, also called the output chaining value (OCV), replaces chaining value 382 of the parameter block.

In one example, for the SHA3 and SHAKE functions, the Keccak[c] algorithm uses a 1,600-bit state array in the parameter block. The state array comprises 25 lanes having 64 bits each. The bits of the state array are numbered from 0 to 1,599, and the bits of each lane are numbered from 0 to 63.

In the parameter block, the bytes of the state array appear in ascending order from left-to-right; but within each byte, the bits appear in descending order from left to right. That is, byte 0 of the parameter block contains (from left to right) bits 7, 6, 5, 4, 3, 2, 1, and 0 of the state array; byte 1 contains bits 15, 14, 13, 12, 11, 10, 9 and 8 of the state array; and so forth. When represented in memory, the bit positions of any individual lane of the state array correspond to powers of two. (In other embodiments, the ordering may be different.)

The bit ordering of the parameter block described above also applies to the message bytes of the second operand. For the KLMD-SHAKE functions, the results stored in the first operand are similar to that of the parameter block in that the left-to-right ordering of bits within each byte is 7, 6, 5, 4, 3, 2, 1, and 0.

Further, in operation, when the remaining second operand length is less than a full block (e.g., 168 bytes), processing is as described below.

Figure 4:
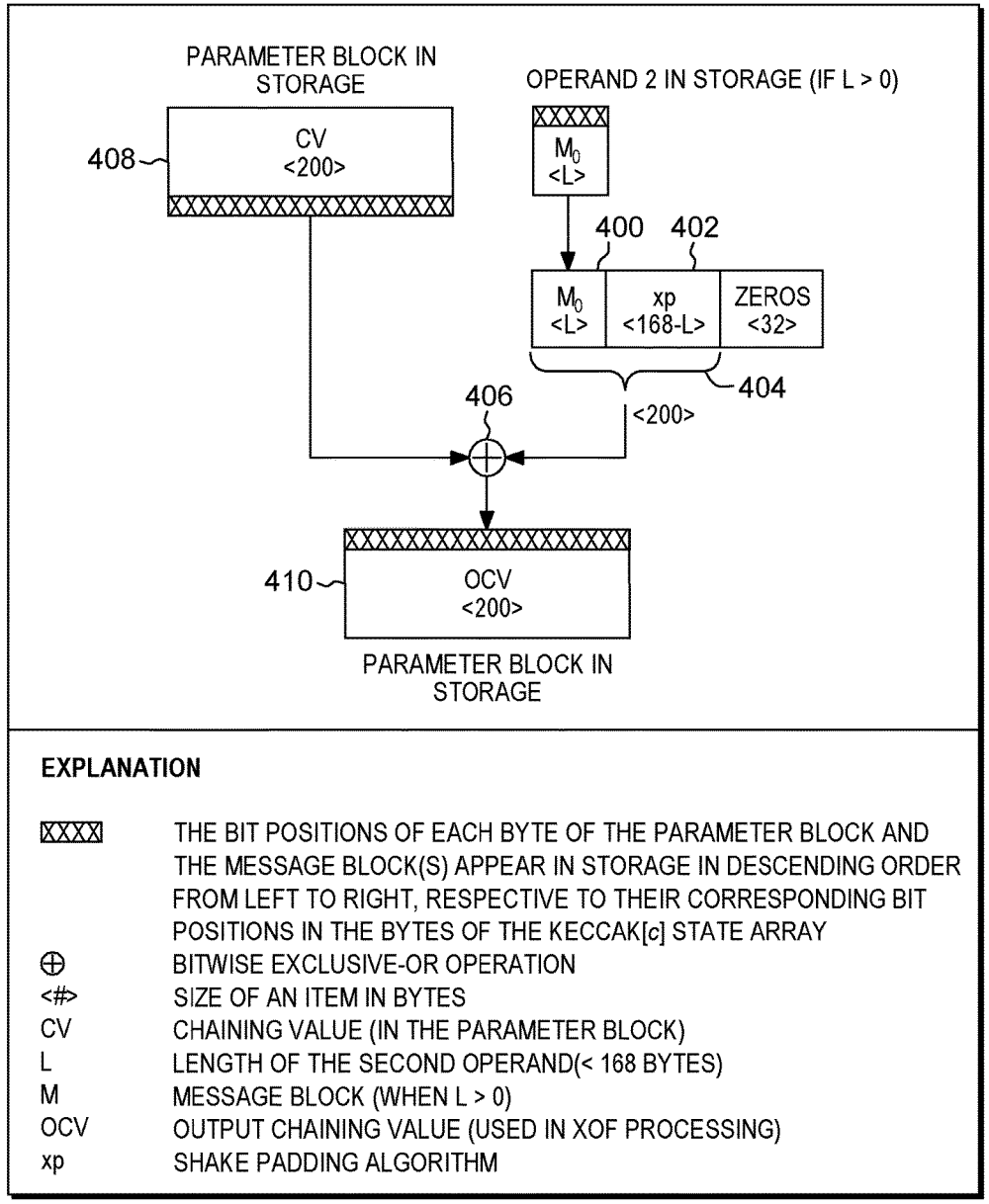
FIG. 4 depicts one example of a padding operation used by the Compute Last Message Digest instruction, in accordance with an aspect of the present invention.

When the padding state, bit 55 of general register 0 is zero (indicating that padding has not yet been performed), padding occurs, as described below and with reference to FIG. 4:

Any remaining bytes of the second operand 400 are padded on the right 402, as described for the symbol "xp<n>", to form a 168-byte message block 404. Padding occurs even when there are no remaining bytes in the second operand and does not alter the contents of the second operand.

The padding state control is set to one, indicating that padding has been performed.

The second operand address in general register $R_2$ is incremented by the number of message bytes processed, and the second operand length in general register $R_2+1$ is set to zero.

The 168-byte padded message 404 is exclusive ORed 406 with the contents of the state array 408 (from the ICV in the parameter block or from the OCV resulting from the previous block's processing) to form an output chaining value 410 that is used in the extended-output function (XOF) processing.

Depending on the number of second operand blocks processed when padding is completed, either (a) the output chaining value is stored into the parameter block, and the instruction completes by setting condition code, e.g., 3 (partial completion), or (b) the operation continues with extended-output function (XOF) processing, as described below.

Figure 5:
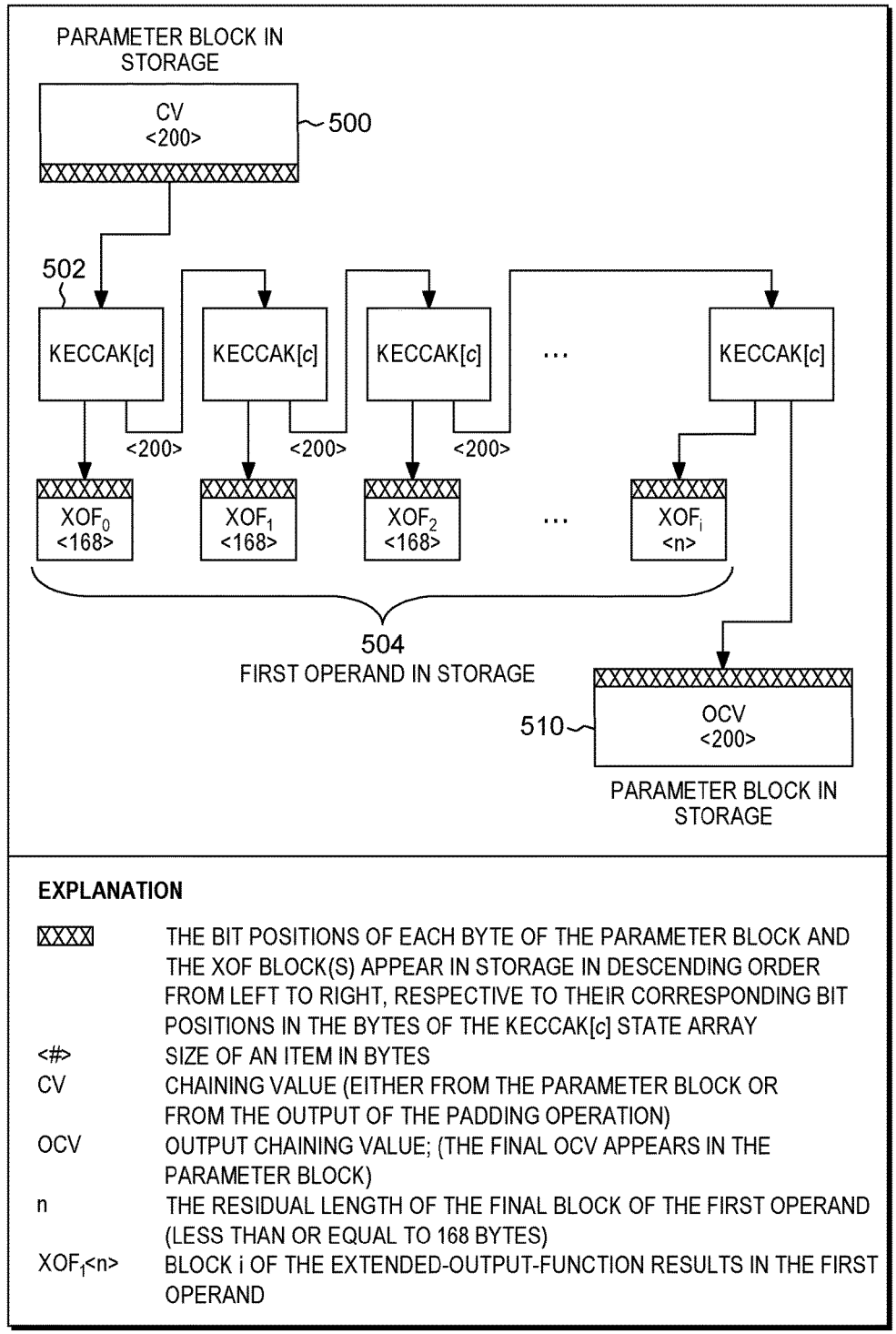
FIG. 5 depicts one example of extended output function processing of the Compute Last Message Digest instruction of FIG. 3A, in accordance with an aspect of the present invention.

When the padding state is one (indicating that padding has been performed for the message, either by the current or a previous execution of the instruction), extended-output function (XOF) processing is performed as described below with reference to FIG. 5.

1. If the first operand length in general register $R_1+1$ is zero, then the output chaining value is stored into the parameter block 500, and the instruction completes with condition code, e.g., 0. If the first operand length is zero at the beginning of the instruction, then it is model dependent whether the ICV is fetched from the parameter block and stored back unmodified as the OCV.
2. The Keccak[c] function 502 is invoked using the previous output chaining value (OCV) as input, and replacing the output chaining value.
3. General register $R_1$ contains the current address of the first operand, and general register $R_1+1$ contains the remaining length of the first operand. The number of bytes to be stored, n, is either the remaining first operand length or 168, whichever is smaller.

The first n bytes of the output chaining value are stored at the first operand location.

The first operand address in general register $R_1$ is incremented by n, and the first operand length general register $R_1+1$ is decremented by n.

Steps 1-3 of this process are repeated until the first operand length becomes zero (in which case, the instruction completes with condition code, e.g., 0) or until a CPU determined number of bytes have been stored (in which case, the instruction completes with condition code, e.g., 3).

The output chaining value 510 is stored into bytes 0-199 of the parameter block regardless of whether condition code 0 or 3 is set.

KLMD-SHAKE-256 (KLMD Function Code 37)

For this function, the parameter block used also includes chaining value 382, as shown in FIG. 3H.

In operation of this function, when the length of the second operand in general register $R_2+1$ is greater than or equal to 136 bytes, a 200-byte intermediate message digest is generated for the 136-byte message blocks in operand 2 using the Keccak[c] algorithm with the 200-byte initial chaining value in the parameter block. The generated intermediate message digest, also called the output chaining value (OCV), replaces the chaining value of the parameter block. The numbering of the bits in the parameter block and second operand as compared with the numbering of the bits in the state array are as described above. This operation proceeds until the length of the second operand is less than 136 bytes, at which point the operation continues as described below.

Figure 6:
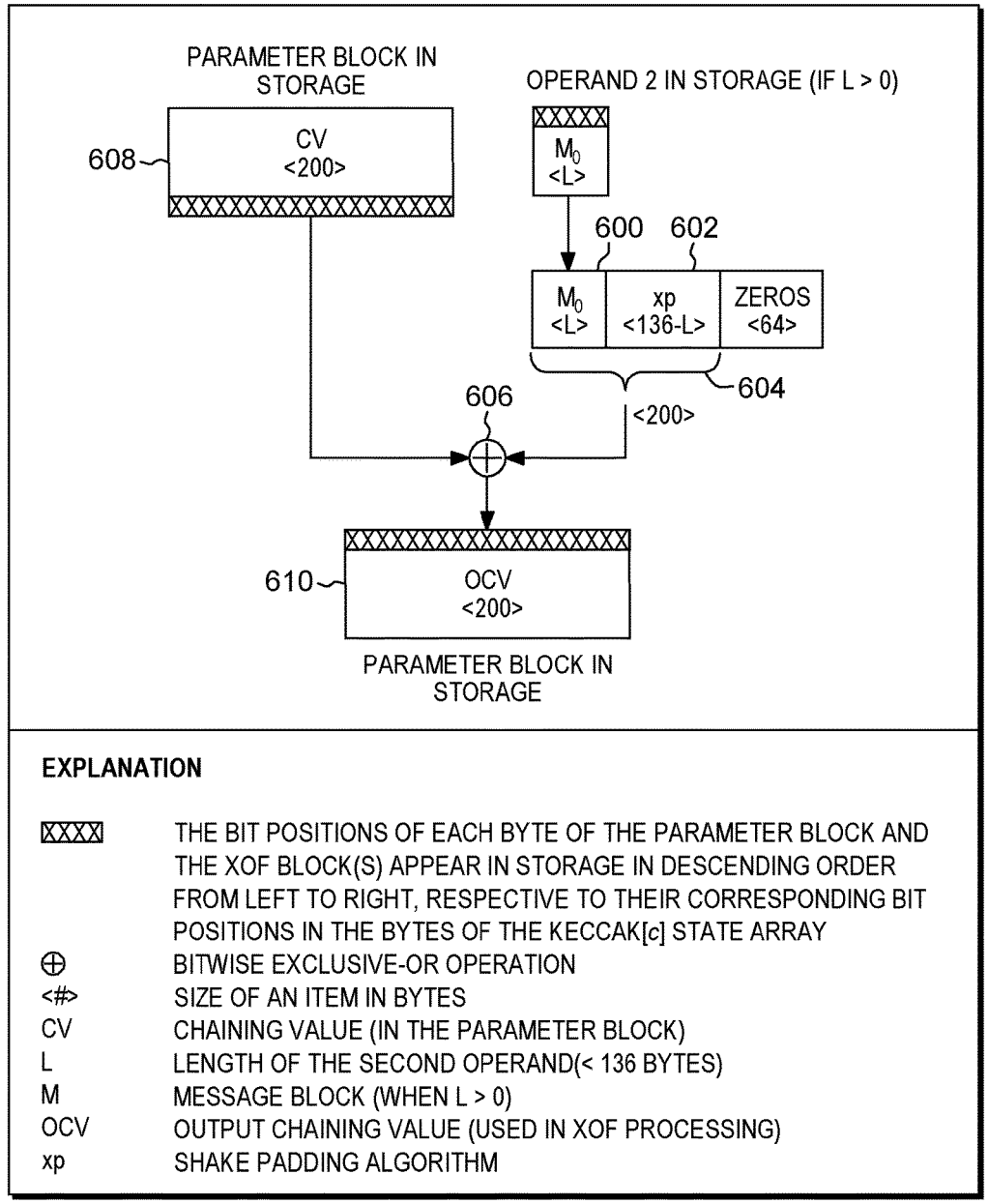
FIG. 6 depicts another example of padding by the Compute Last Message Digest instruction of FIG. 3A, in accordance with an aspect of the present invention.

When the padding state, bit 55 of general register 0 is zero (indicating that padding has not yet been performed), padding occurs, as described below and with reference to FIG. 6:

Any remaining bytes of the second operand 600 are padded on the right 602, as described for the symbol "xp<n>", to form a 136-byte message block 604. Padding occurs even when there are no remaining bytes in the second operand and does not alter the contents of the second operand.

The padding state control is set to one, indicating that padding has been performed.

The second operand address in general register $R_2$ is incremented by the number of message bytes processed, and the second operand length in general register $R_2+1$ is set to zero.

The 136-byte padded message 604 is exclusive ORed 606 with the contents of the state array 608 (from the ICV in the parameter block or from the OCV resulting from the previous block's processing) to form an output chaining value 610 that is used in the extended-output function (XOF) processing.

Depending on the number of second operand blocks processed when padding is completed, either (a) the output chaining value is stored into the parameter block, and the instruction completes by setting condition code, e.g., 3 (partial completion), or (b) the operation continues with extended-output function (XOF) processing, as described below.

Figure 7:
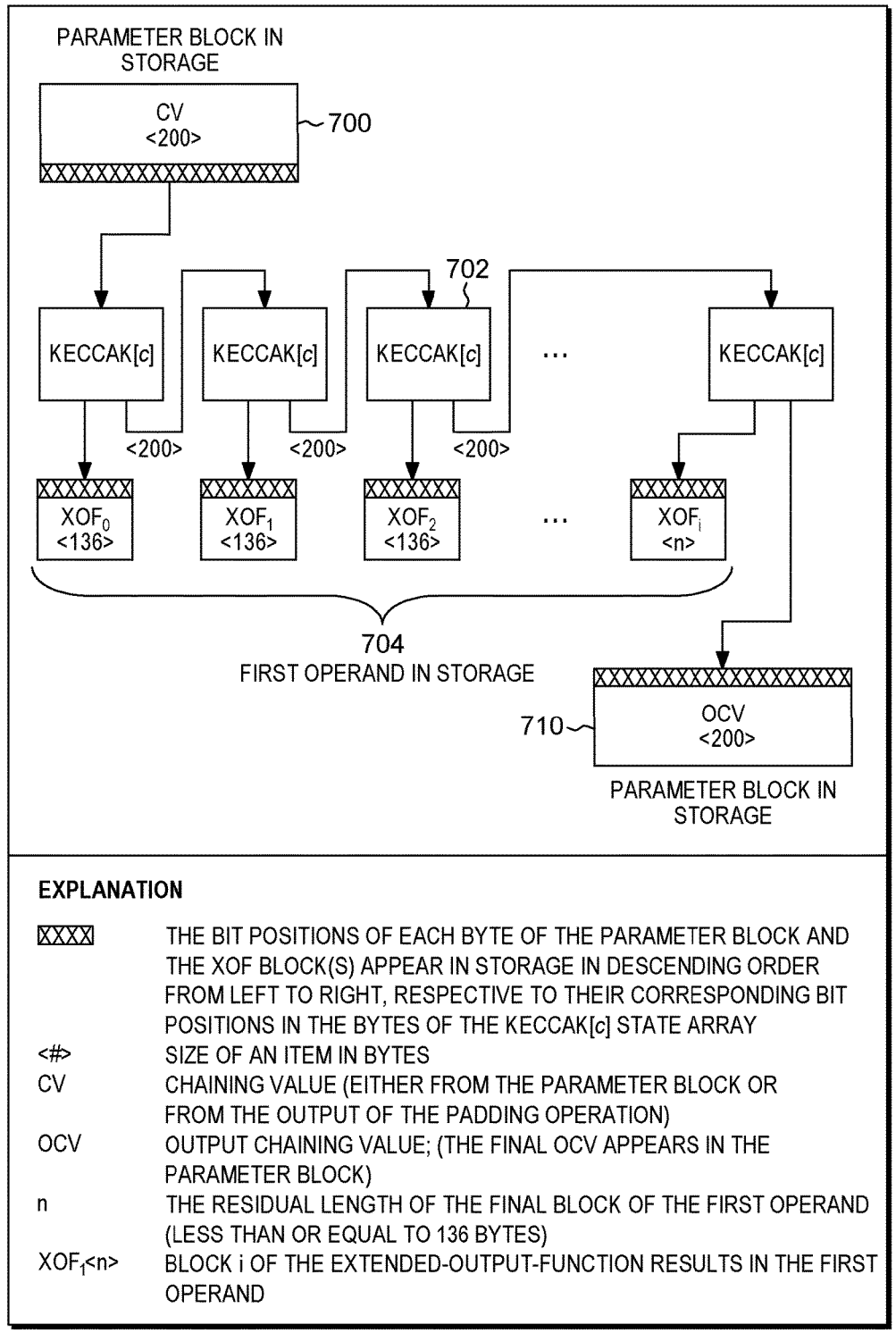
FIG. 7 depicts another embodiment of extended output function processing of the Compute Last Message Digest instruction of FIG. 3A, in accordance with an aspect of the present invention.

When the padding state is one (indicating that padding has been performed for the message, either by the current or a previous execution of the instruction), extended-output function (XOF) processing is performed as described below with reference to FIG. 7.

1. If the first operand length in general register $R_1+1$ is zero, then the output chaining value is stored into the parameter block 700, and the instruction completes with condition code 0. If the first operand length is zero at the beginning of the instruction, then it is model dependent whether the ICV is fetched from the parameter block and stored back unmodified as the OCV.
2. The Keccak[c] 702 function is invoked using the previous output chaining value (OCV) as input, and replacing the output chaining value.
3. General register $R_1$ contains the current address of the first operand, and general register $R_1+1$ contains the remaining length of the first operand. The number of bytes to be stored, n, is either the remaining first operand length or 136, whichever is smaller.

The first n bytes of the output chaining value are stored at the first-operand location 704.

The first operand address in general register $R_1$ is incremented by n, and the first operand length general register $R_1+1$ is decremented by n.

Steps 1-3 of this process are repeated until the first operand length becomes zero (in which case, the instruction completes with condition code, e.g., 0) or until a CPU determined number of bytes have been stored (in which case, the instruction completes with condition code, e.g., 3). The output chaining value 710 is stored into bytes 0-199 of the parameter block regardless of whether condition code 0 or 3 is set.

Special Conditions for the KLMD Instruction:

A specification exception is recognized and no other action is taken if any of the following occurs, in one example:

Bit 56 of general register 0 is not zero.

Bits 57-63 of general register 0 specify an unassigned or uninstalled function code.

The $R_2$ field designates an odd-numbered register or general register 0.

For the KLMD-SHAKE functions, either of the following is true:

The $R_1$ field designates an odd-numbered register, general register 0, or register $R_2$.

The second operand length is nonzero, and the padding state is one.

Resulting Condition Code:

0 Normal completion

1 -

2 -

3 Partial completion

In one embodiment:

For the KLMD-SHAKE functions, when condition code 3 is set during the XOF processing, the first operand address and length in general registers $R_1$ and $R_1+1$, respectively, are updated such that the program can branch back to the instruction to continue the operation.

For unusual situations, the CPU protects against endless reoccurrence for the no-progress case. Thus, the program can safely branch back to the instruction whenever condition code 3 is set with no exposure to an endless loop.

The Compute Last Message Digest instruction does not require the second operand to be a multiple of the data block size. It first processes complete blocks, and may set condition code, e.g., 3 before processing all blocks. After processing all complete blocks, it then performs the padding operation including the remaining portion of the second operand. This may use one or two iterations of the designated block digest algorithm.

The Compute Last Message Digest instruction provides the SHA padding for messages that are a multiple of eight bits in length. If a SHA function is to be applied to a bit string which is not a multiple of eight bits, the program is to perform the SHA padding and use the Compute Intermediate Message Digest instruction.

For the KLMD-SHAKE functions, the following applies, in one example:

a. The padding state, bit 55 of general register 0, is to be set to zero prior to the first execution of KLMD for a message, and the padding state is not to be altered by the program for any subsequent executions of KLMD for the same message until normal completion occurs.

b. If padding of the final (short or null) block of the second operand is performed when the first operand length is zero, then the padded block is exclusive ORed with the contents of the state array, the result is stored as the output chaining value in the parameter block, and the instruction completes with condition code 0. The Keccak[c] function is not invoked in this case.

The KLMD SHA-3 and SHAKE functions perform padding (e.g., using a specified sequence of bits), in one aspect, according to the final NIST SHA-3 specification. Earlier versions of the SHA-3 specification used different padding bit sequences. Software that was designed according to the earlier SHA-3 specifications can still benefit from the KIMD SHA-3 and SHAKE functions if the software performs the padding of the last message block.

As described herein, one or more functions of the Compute Last Message Digest instruction perform a padding operation. However, in one embodiment, this padding operation is to be performed one time, and therefore, certain processing is performed. Additional details regarding this processing are described with reference to FIG. 8. This processing is performed by at least one processor.

Figure 8:
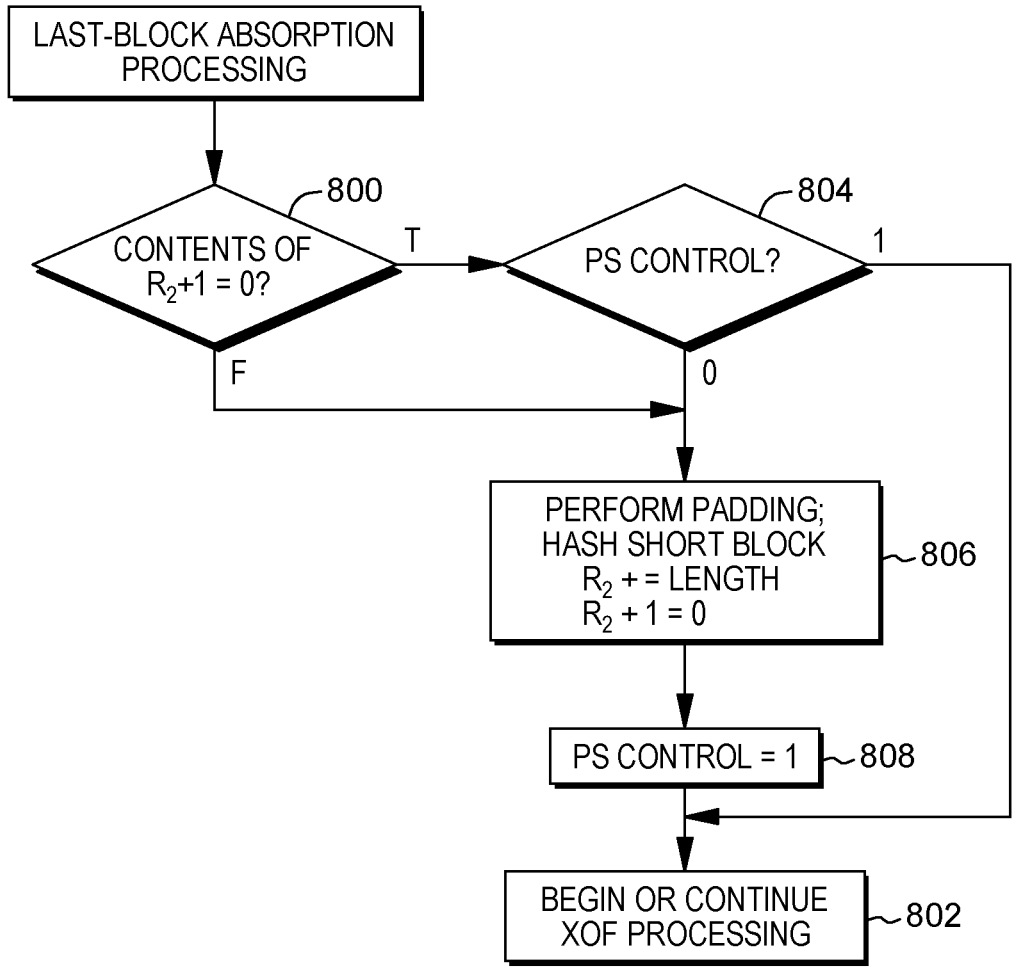
FIG. 8 depicts one example of using a padding state control, in accordance with an aspect of the present invention.

Referring to FIG. 8, initially, based on processing of the final block of an input message, a determination is made as to whether the length of the second operand is equal to a specified value, e.g., 0, INQUIRY 800. If the length is not equal to zero, then padding is performed on the final (short) block, the padded block is hashed using the Keccak algorithm, the second operand address in register $R_2$ is incremented by the number of bytes processed, and the second operand length in general register $R_2+1$ is set to zero, STEP 806. The padding state control is set to one, STEP 808, and then extended output function processing begins, STEP 802. An example of this processing is described above.

Returning to INQUIRY 800, if the length of the second operand is equal to the specified value, then a check of the padding state control is performed, INQUIRY 804. If the padding state control is set to one, indicating that padding has previously been performed for this message, then the extended-output function processing either begins or continues, STEP 802. However, returning to INQUIRY 804, if the padding state control is set to zero, indicating that padding has not been performed for this message, then padding is performed as described herein, the padded block is hashed using the Keccak algorithm, the second operand address in register $R_2$ is incremented by the number of bytes processed, and the second operand length in general register $R_2+1$ is set to zero, STEP 806. The padding state control is set to one, STEP 808, and the extended-output function processing begins, STEP 802. This completes processing.

As described herein, a capability is provided to distinguish between multiple conditions at the beginning of instruction execution that include whether a null second operand message has been specified or padding has already been performed. By providing this control, processing within a computing environment is facilitated, including authentication of data, as well as other processing. Thus, aspects of the invention are inextricably tied to computing technology.

Further details regarding facilitating processing within a computing environment, including executing an instruction and using the padding control, are described with reference to FIGS. 9A-9B.

Figure 9A:
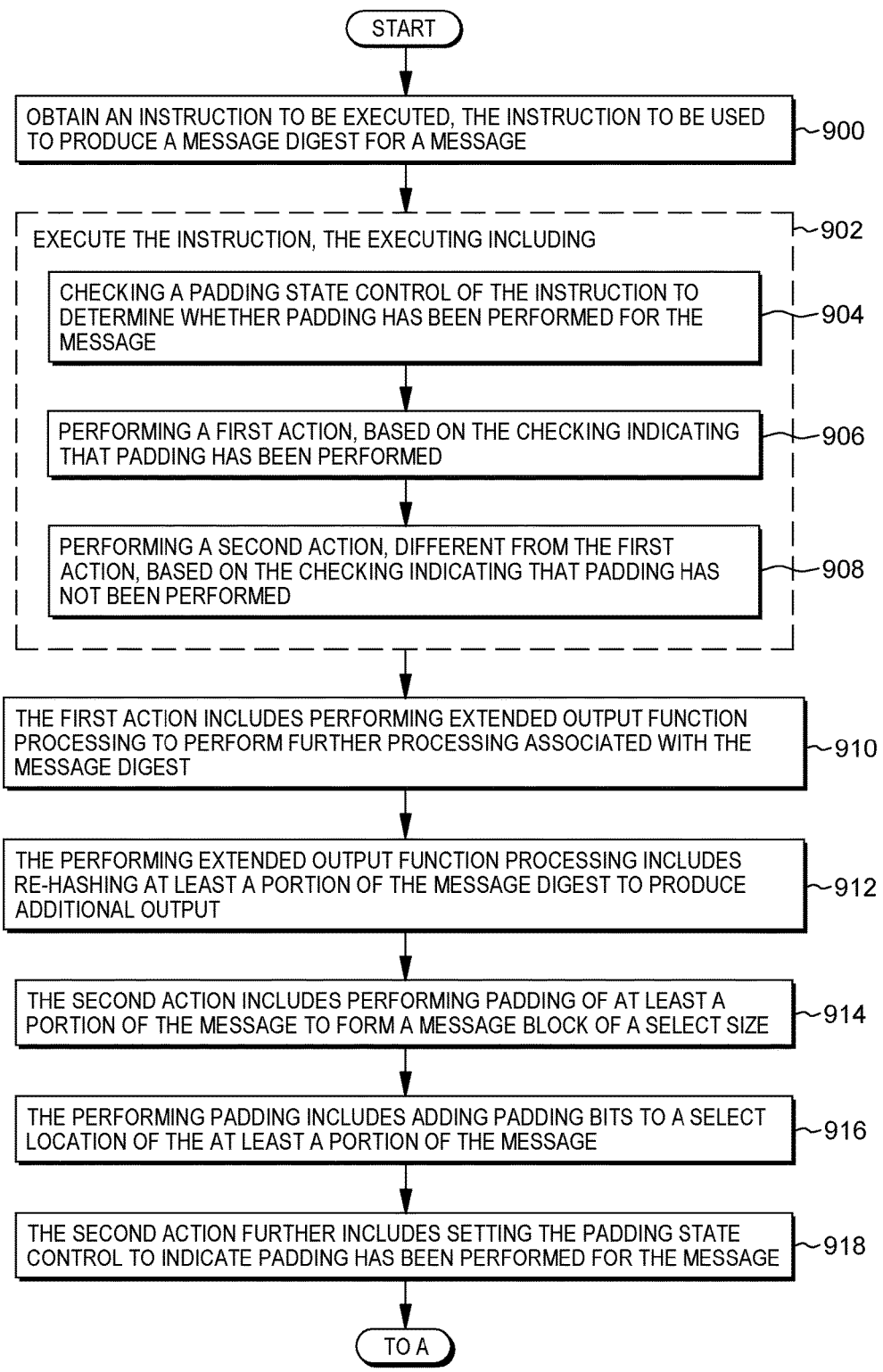
FIGS. 9A-9B depicts one example of facilitating processing in a computing environment, which includes executing an instruction that uses a padding operation, in accordance with an aspect of the present invention.

Referring to FIG. 9A, an instruction to be used to produce a message digest for a message is obtained, STEP 900, and executed by at least one processor, STEP 902. The executing includes, for instance, checking a padding state control of the instruction to determine whether padding has been performed for the message, STEP 904; performing a first action, based on the checking indicating that padding has been performed, STEP 906; and performing a second action, different from the first action, based on the checking indicating that padding has not been performed, STEP 908.

As an example, the first action includes performing extended output function processing to perform further processing associated with the message digest, STEP 910. The performing extended output function processing includes, e.g., re-hashing at least a portion of the message digest to produce additional output, STEP 912.

Further, as an example, the second action includes performing padding of at least a portion of the message to form a message block of a select size, STEP 914. The performing padding includes, e.g., padding bits zeros to a select location of the at least a portion of the message, STEP 916. Further, the second action includes setting the padding state control to indicate padding has been performed for the message, STEP 918.

Figure 9B:
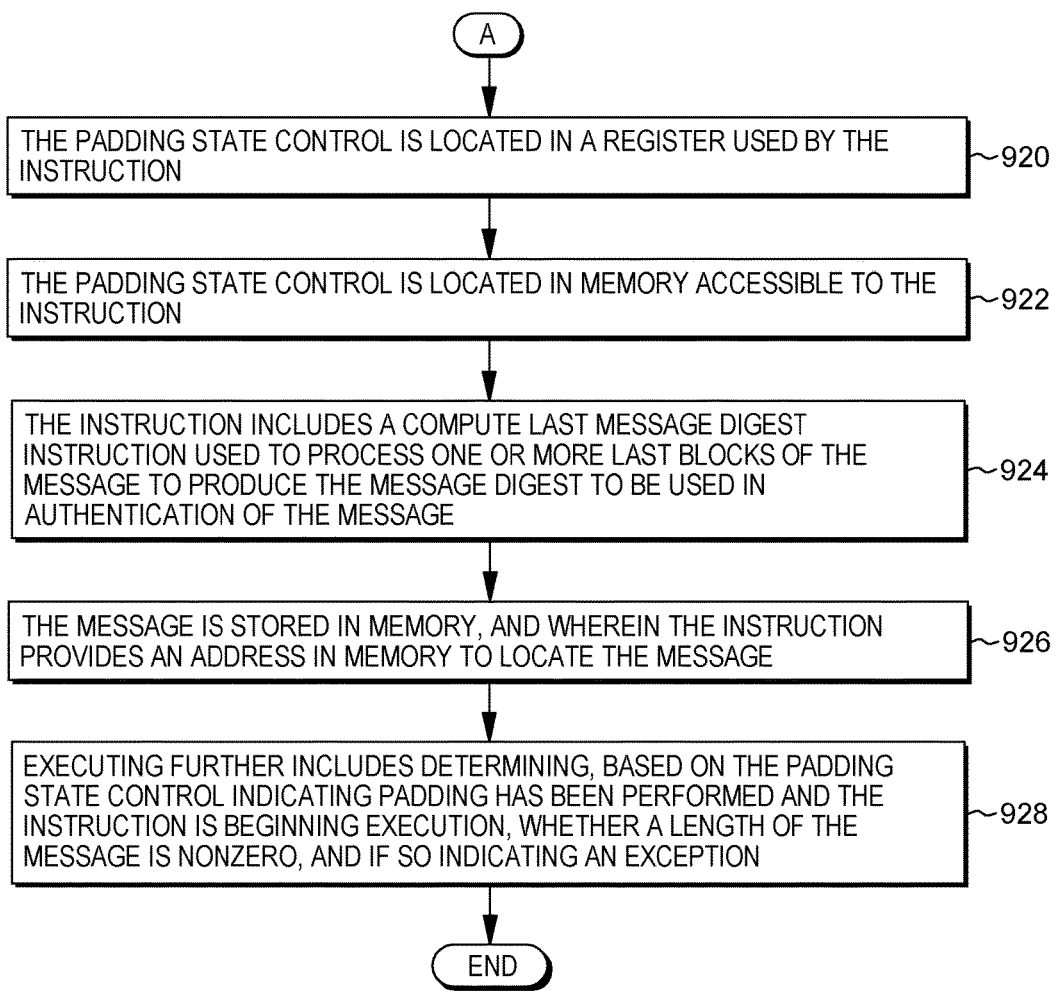

Referring to FIG. 9B, as examples, the padding state control is located in a register used by the instruction (920), or the padding state control is located in memory accessible to the instruction (922).

In one example, the instruction is a Compute Last Message Digest instruction used to process one or more last blocks of the message to produce the message digest to be used in authentication of the message (924).

The message is, for instance, stored in memory, and the instruction provides an address in memory to locate the message (926).

In one embodiment, the executing further includes determining, based on the padding state control indicating padding has been performed and based on the instruction beginning execution, whether a length of the message is nonzero; and indicating an exception based on the determining indicating the length is nonzero, the padding state control indicating padding has been performed and the instruction beginning execution, STEP 928.

Although various embodiments and examples are provided herein, many variations are possible. For instance, values that are included in registers and/or fields used by the instruction may, in other embodiments, be in other locations, such as memory locations, etc. Further, other, additional or less fields or registers, or other sizes may be used. Many variations are possible. For instance, implicit registers may be used instead of explicitly specified registers or fields. Additionally, one or more aspects of the present invention may be used with other hashing algorithms and/or other techniques or processes. Other variations are also possible.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing in a computing environment, the computer-implemented method comprising:
   obtaining, by at least one processor, an instruction to be executed, the instruction to be used to produce a message digest for a message; and
   executing the instruction to be used to produce the message digest for the message, the executing comprising:
       checking a padding state control of the instruction to determine whether padding has been performed for the message, the padding state control being an indicator input to the instruction;
       performing a first action, based on the checking indicating that padding has been performed for the message for which the message digest is to be produced and that the indicator is set to one value; and
       performing a second action, different from the first action, based on the checking indicating that padding has not been performed for the message for which the message digest is to be produced and that the indicator is set to another value.

2. The computer-implemented method of claim 1, wherein the first action comprises performing extended output function processing to perform further processing associated with the message digest.

3. The computer-implemented method of claim 1, wherein the second action comprises performing padding of at least a portion of the message to form a message block of a select size.

4. The computer-implemented method of claim 1, wherein the instruction comprises a Compute Last Message Digest instruction used to process one or more last blocks of the message to produce the message digest to be used in authentication of the message.

5. The computer-implemented method of claim 1, wherein the executing further comprises:
   determining, based on the padding state control indicating padding has been performed and based on the instruction beginning execution, whether a length of the message is nonzero; and
   indicating an exception based on the determining indicating the length is nonzero, the padding state control indicating padding has been performed and the instruction beginning execution.

6. A computer program product for facilitating processing in a computing environment, the computer program product comprising:
   a non-transitory computer readable storage medium readable by a processing circuit and storing instructions for execution by the processing circuit for performing a method comprising:
       obtaining an instruction to be executed, the instruction to be used to produce a message digest for a message; and
       executing the instruction to be used to produce the message digest for the message, the executing comprising:
           checking a padding state control of the instruction to determine whether padding has been performed for the message, the padding state control being an indicator input to the instruction;

performing a first action, based on the checking indicating that padding has been performed for the message for which the message digest is to be produced and that the indicator is set to one value; and performing a second action, different from the first action, based on the checking indicating that padding has not been performed for the message for which the message digest is to be produced and that the indicator is set to another value.

7. The computer program product of claim 6, wherein the first action comprises performing extended output function processing to perform further processing associated with the message digest.

8. The computer program product of claim 7, wherein the performing extended output function processing includes re-hashing at least a portion of the message digest to produce additional output.

9. The computer program product of claim 6, wherein the second action comprises performing padding of at least a portion of the message to form a message block of a select size.

10. The computer program product of claim 9, wherein the performing padding comprises adding padding bits to a select location of the at least a portion of the message.

11. The computer program product of claim 9, wherein the second action further comprises setting the padding state control to indicate padding has been performed for the message.

12. The computer program product of claim 6, wherein the padding state control is located in a register used by the instruction.

13. The computer program product of claim 6, wherein the padding state control is located in memory accessible to the instruction.

14. The computer program product of claim 6, wherein the instruction comprises a Compute Last Message Digest instruction used to process one or more last blocks of the message to produce the message digest to be used in authentication of the message.

15. The computer program product of claim 6, wherein the message is stored in memory, and wherein the instruction provides an address in memory to locate the message.

16. The computer program product of claim 6, wherein the executing further comprises:
   determining, based on the padding state control indicating padding has been performed and based on the instruction beginning execution, whether a length of the message is nonzero; and
   indicating an exception based on the determining indicating the length is nonzero, the padding state control indicating padding has been performed and the instruction beginning execution.

17. A computer system for facilitating processing in a computing environment, the computer system comprising:
   a memory; and
   a processor in communication with the memory, wherein the computer system is configured to perform a method, said method comprising:
      obtaining an instruction to be executed, the instruction to be used to produce a message digest for a message; and
      executing the instruction to be used to produce the message digest for the message, the executing comprising:
         checking a padding state control of the instruction to determine whether padding has been performed for the message, the padding state control being an indicator input to the instruction;
         performing a first action, based on the checking indicating that padding has been performed for the message for which the message digest is to be produced and that the indicator is set to one value; and
         performing a second action, different from the first action, based on the checking indicating that padding has not been performed for the message for which the message digest is to be produced and that the indicator is set to another value.

18. The computer system of claim 17, wherein the first action comprises performing extended output function processing to perform further processing associated with the message digest.

19. The computer system of claim 17, wherein the second action comprises performing padding of at least a portion of the message to form a message block of a select size.

20. The computer system of claim 17, wherein the executing further comprises:
   determining, based on the padding state control indicating padding has been performed and based on the instruction beginning execution, whether a length of the message is nonzero; and
   indicating an exception based on the determining indicating the length is nonzero, the padding state control indicating padding has been performed and the instruction beginning execution.

\* \* \* \* \*